United States Patent
Kashiwazaki et al.

(10) Patent No.: US 10,880,046 B2
(45) Date of Patent: Dec. 29, 2020

(54) DATA COLLECTION SYSTEM, DATA COLLECTION METHOD, CLIENT APPARATUS, SERVER APPARATUS, AND PROGRAM

(71) Applicant: APTPOD, INC., Tokyo (JP)

(72) Inventors: Hikaru Kashiwazaki, Tokyo (JP); Hirotaka Kajita, Tokyo (JP)

(73) Assignee: APTPOD, INC., Tokyo (JP)

( * ) Notice: Subject to any disclaimer, the term of this patent is extended or adjusted under 35 U.S.C. 154(b) by 0 days.

(21) Appl. No.: 16/342,843

(22) PCT Filed: Apr. 11, 2017

(86) PCT No.: PCT/JP2017/014782
§ 371 (c)(1),
(2) Date: Apr. 17, 2019

(87) PCT Pub. No.: WO2018/078913
PCT Pub. Date: May 3, 2018

(65) Prior Publication Data
US 2019/0253195 A1    Aug. 15, 2019

(30) Foreign Application Priority Data
Oct. 24, 2016    (JP) .................................. 2016-207948

(51) Int. Cl.
*H04L 1/18*    (2006.01)
*H04L 29/06*    (2006.01)
(Continued)

(52) U.S. Cl.
CPC ............ *H04L 1/1809* (2013.01); *G06F 13/00* (2013.01); *H04L 1/1628* (2013.01);
(Continued)

(58) Field of Classification Search
CPC ..... H04L 67/42; H04L 1/1628; H04L 1/1835; H04L 1/16; H04L 1/1809; H04W 4/38; G06F 11/1443; G06F 13/00
See application file for complete search history.

(56) References Cited

U.S. PATENT DOCUMENTS

2003/0023735 A1 * 1/2003 Funahashi ............... G06F 21/34
                                                      709/229
2007/0088225 A1 * 4/2007 Tanaka ................... A61B 5/681
                                                      600/503
(Continued)

FOREIGN PATENT DOCUMENTS

JP    2002-324013 A    11/2002
JP    2005-276209 A    10/2005

OTHER PUBLICATIONS

Jun. 2, 2020 Extended Search Report issued in European Patent Application No. 17864592.5.

*Primary Examiner* — Guy J Lamarre
(74) *Attorney, Agent, or Firm* — Oliff PLC (57) ABSTRACT

To reduce the load of processing for ensuring the completeness of data. A client apparatus acquires multiple pieces of data indicating a physical amount detected by a sensor. The client apparatus transmits, to a server apparatus, a data set (section) including a data string (multiple units) indicating a portion of the received multiple pieces of data, and first information (unit count) indicating the number of the pieces of data included in the data string. The server apparatus receives the data set from the client apparatus. The server apparatus processes the received data set. The client apparatus re-transmits the data set to the server apparatus if a condition that the number of the pieces of data included in the data set received by the server apparatus and the number of the pieces of data indicated by the first information are different is satisfied.

18 Claims, 6 Drawing Sheets

(51) Int. Cl.
*H04W 4/38* (2018.01)
*H04L 1/16* (2006.01)
*G06F 13/00* (2006.01)

(52) U.S. Cl.
CPC ............ *H04L 1/1835* (2013.01); *H04L 67/42* (2013.01); *H04W 4/38* (2018.02)

(56) References Cited

U.S. PATENT DOCUMENTS

2014/0029587 A1    1/2014  Hirata et al.
2016/0344802 A1*  11/2016  Tanaka .................. H04L 67/306

* cited by examiner

ABSTRACT

DATA COLLECTION SYSTEM, DATA COLLECTION METHOD, CLIENT APPARATUS, SERVER APPARATUS, AND PROGRAM

TECHNICAL FIELD

The present invention relates to a technique for collecting data output from a sensor.

BACKGROUND ART

A technique for collecting data output from a sensor is known. For example, Patent Document 1 discloses that data indicating a position of a vehicle is collected by a sensor, and the data is transmitted to a center in real time.

CITATION LIST

Patent Document

Patent Document 1: JP 2005-276209A

SUMMARY OF INVENTION

Technical Problem

As with the technique disclosed in Patent Document 1, if data is transmitted via a communication line, data goes missing during transmission in some cases. In this case, in order to ensure the completeness of the data, for example, data missingness management needs to be performed, and the missing data needs to be re-transmitted. However, for example, in a case where several hundreds to several thousands of pieces of data are collected in one second, if data missingness management is performed for each piece of data, the amount of data needed for missingness management will increase, and the load of processing for ensuring the completeness of the data will increase.

An object of the present invention is to reduce the load of processing for ensuring the completeness of the data.

Solution to Problem

The present invention provides a data collection system including: an acquisition unit in a client apparatus, configured to acquire a plurality of pieces of data indicating a physical amount detected by a sensor; a transmission unit in the client apparatus, configured to transmit, to a server apparatus, a data set including a data string including at least a portion of the received plurality of pieces of data and first information indicating the number of pieces of data included in the data string; a reception unit in the server apparatus, configured to receive the data set from the client apparatus; a processing unit in the server apparatus, configured to process the received data set; and a re-transmission unit in the client apparatus, configured to re-transmit the data set to the server apparatus if a condition indicating that the number of the pieces of data included in the data set received by the server apparatus and the number of the pieces of data indicated by the first information are different is satisfied.

The present invention provides a data collection method including: acquiring by a client apparatus, a plurality of pieces of data indicating a physical amount detected by a sensor; transmitting, from the client apparatus to a server apparatus, a data set including a data string including at least a portion of the received plurality of pieces of data and first information indicating the number of pieces of data included in the data string; receiving, in the server apparatus, the data set from the client apparatus; processing the received data set in the server apparatus; and re-transmitting, from the client apparatus, the data set to the server apparatus if a condition indicating that the number of the pieces of data included in the data set received by the server apparatus and the number of the pieces of data indicated by the first information are different is satisfied.

The present invention provides a client apparatus including: an acquisition unit configured to acquire a plurality of pieces of data indicating a physical amount detected by a sensor; a transmission unit configured to transmit, to a server apparatus, a data set including a data string including at least a portion of the received plurality of pieces of data and first information indicating the number of pieces of data included in the data string; and a re-transmission unit configured to re-transmit the data set to the server apparatus if a condition indicating that the number of the pieces of data included in the data set received by the server apparatus and the number of the pieces of data indicated by the first information are different is satisfied.

The present invention provides a server apparatus including: a reception unit configured to receive a data set including a data string including at least a portion of a plurality of pieces of data indicating a physical amount detected by a sensor and first information indicating the number of pieces of data included in the data string, from a client apparatus including: an acquisition unit configured to acquire the plurality of pieces of data, a transmission unit configured to transmit the data set to a server apparatus, and a re-transmission unit configured to re-transmit the data set to the server apparatus after a predetermined amount of time elapses from transmission of the data set without receipt of a response; a processing unit configured to process the received data set; and a response unit configured to send the response to the client apparatus if the number of the pieces of the data included in the received data set and the number of the pieces of data indicated by the first information match.

The present invention provides a program for causing a computer to execute: acquiring a plurality of pieces of data indicating a physical amount detected by a sensor; transmitting, to a server apparatus, a data set including a data string including at least a portion of the received plurality of pieces of data and first information indicating the number of pieces of data included in the data string; and re-transmitting the data set to the server apparatus if a condition indicating that the number of the pieces of data included in the data set received by the server apparatus and the number of the pieces of data indicated by the first information are different is satisfied.

The present invention provides a program for causing a computer to execute: receiving a data set including a data string including at least a portion of a plurality of pieces of data indicating a physical amount detected by a sensor and first information indicating the number of pieces of data included in the data string, from a client apparatus including: a reception unit configured to receive the plurality of pieces of data, a transmission unit configured to transmit the data set to a server apparatus, and a re-transmission unit configured to re-transmit the data set to the server apparatus after a predetermined amount of time elapses from transmission of the data set without receipt of a response; processing the received data set; and sending the response to the client apparatus if the number of the pieces of data included in the received data set and the number of the pieces of data indicated by the first information match.

Advantageous Effect of the Invention

According to the present invention, it is possible to reduce the load of processing for ensuring completeness of data.

DESCRIPTION OF EMBODIMENTS

Configuration

Figure 1:
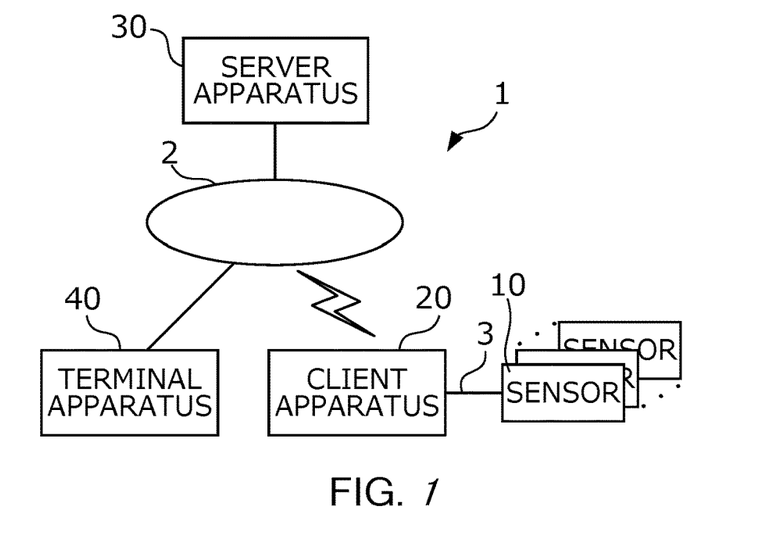
FIG. 1 is a diagram showing an example of data collection system 1.

FIG. 1 is a diagram showing an example of data collection system 1 according to the present embodiment. Data collection system 1 provides a mechanism for collecting data output from various sensors 10 and managing the data all together. For example, if the sensing target is a car, data output from various sensors 10 provided in the car, such as a tachometer that measures the rotation rate of the engine, a speedometer that measures the speed of the car, an angle gauge that measures the angle of steering, a fuel ejection amount gauge, a thermometer, and a GPS (Global Positioning System) that measures the position of the car.

Sensors 10 include sensor elements and AD conversion circuits. Sensors 10 detect (measure) physical amounts at predetermined sampling frequencies, and generate and output data indicating the detected physical amounts. For example, several hundreds to several thousands of pieces of data are output in one second from sensors 10. One piece of data includes one measurement value measured by sensor 10. That is, 100 pieces of data include a total of 100 instances' worth of measurement values.

Data collection system 1 includes client apparatus 20, server apparatus 30, and terminal apparatus 40. Client apparatus 20, server apparatus 30, and terminal apparatus 40 are connected via communication line 2. Communication line 2 includes a mobile communication network, for example. In a mobile communication network, communication is performed using a wireless communication standard, such as 3G, LTE (Long Term Evolution), Wi-Fi (registered trademark), WiMAX (registered trademark), or Bluetooth (registered trademark). However, communication line 2 includes not only a mobile communication network, but also another wireless or wired communication line. Client apparatus 20 is connected to sensors 10 via communication line 3. In communication line 3, communication is performed using a predetermined communication standard. For example, CAN (Controller Area Network) protocol is used as the predetermined communication standard.

Note that the number of sensors 10, the number of client apparatuses 20, the number of server apparatuses 30, and the number of terminal apparatuses 40 shown in FIG. 1 are merely exemplary, and there is no limitation thereto. For example, the number of sensors 10 may be larger or smaller than the number illustrated in FIG. 1. Multiple client apparatuses 20 may also be provided.

Figure 2:
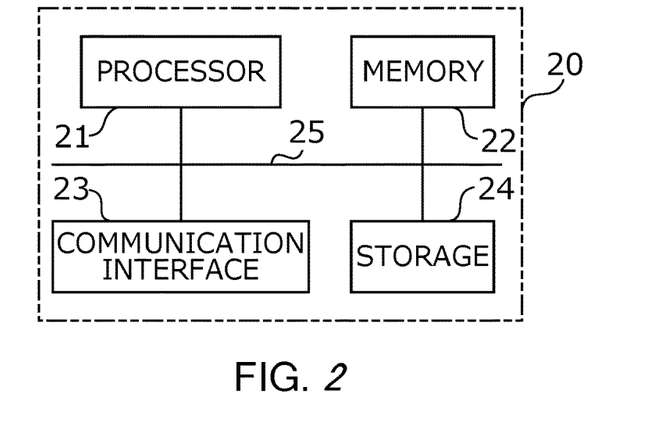
FIG. 2 is a diagram showing an example of a hardware configuration of client apparatus 20.

FIG. 2 is a diagram showing an example of a hardware configuration of client apparatus 20. Client apparatus 20 performs processing for transmitting data output from sensors 10 to server apparatus 30. Client apparatus 20 includes processor 21, memory 22, communication interface 23, and storage 24. Processor 21, memory 22, communication interface 23, and storage 24 are connected via bus 25.

Processor 21 controls the units of client apparatus 20 and performs various types of processing by reading out a program to memory 22 and executing the program. For example, a CPU (Central Processing Unit) is used as processor 21. Memory 22 stores the program to be executed by processor 21. For example, a ROM (Read Only Memory) or a RAM (Random Access Memory) is used as memory 22.

Communication interface 23 is connected to communication line 2 and performs data communication with server apparatus 30 in accordance with a predetermined wireless communication standard. Also, communication interface 23 is connected to communication line 3 and performs data communication with sensors 10 in accordance with a predetermined communication standard. Storage 24 stores various types of data and programs. For example, a hard disk or a flash memory is used as storage 24. Storage 24 stores a client program for causing client apparatus 20 to execute client-side processing.

Figure 3:
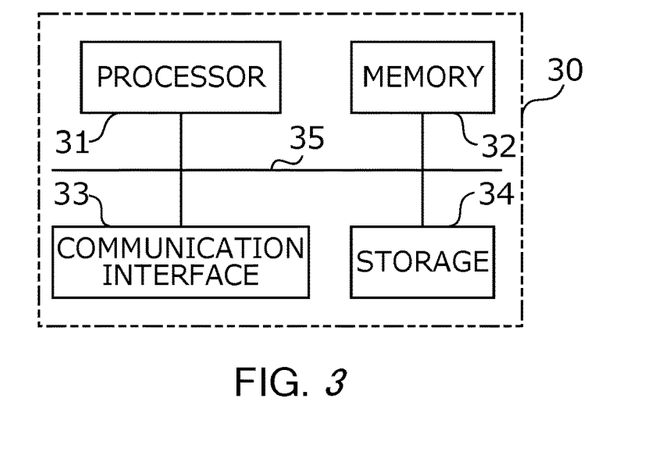
FIG. 3 is a diagram showing an example of a hardware configuration of server apparatus 30.

FIG. 3 is a diagram showing an example of a hardware configuration of server apparatus 30. Server apparatus 30 performs non-real-time processing and real-time processing. The non-real-time processing is processing for accumulating data received from client apparatus 20, for example. Accordingly, the data output from sensors 10 is managed all together. The data is used for various types of analysis of the state of the sensing target, for example. For this reason, in the non-real-time processing, accuracy of the data is required. On the other hand, the real-time processing is processing for transmitting the data received from client apparatus 20 to terminal apparatus 40 in real time (hereinafter referred to as "real-time transmission processing"), for example. Note that real time does not need to be completely simultaneous, and there may be somewhat of a time delay. The data is used by a user to keep track of the current state of the sensing target, for example. For this reason, in the real-time processing, immediacy is required.

Server apparatus 30 includes processor 31, memory 32, communication interface 33, and storage 34. Processor 31, memory 32, communication interface 33, and storage 34 are connected via bus 35.

Processor 31 controls the units of server apparatus 30 and performs various types of processing by reading out a program to memory 32 and executing the program. For example, a CPU is used as processor 31. Memory 32 stores the program to be executed by processor 31. For example, a ROM or a RAM is used as memory 32.

Also, communication interface 33 is connected to communication line 2 and performs data communication with client apparatus 20 in accordance with a predetermined communication standard. Storage 34 stores various types of data and programs. For example, a hard disk or a flash memory is used as storage 34. Storage 34 stores server programs for causing server apparatus 30 to execute server-side processing.

Terminal apparatus 40 is used to output data transmitted through the above-described real-time transmission processing. An apparatus such as a client computer, a tablet terminal, or a smartphone is used as terminal apparatus 40, for example. Terminal apparatus 40 displays the data received from server apparatus 30 on a display. The display of the data may also be performed using a browser, for example. Also, on the display, the data itself may be displayed, or the data may be visualized using an image and displayed.

Figure 4:
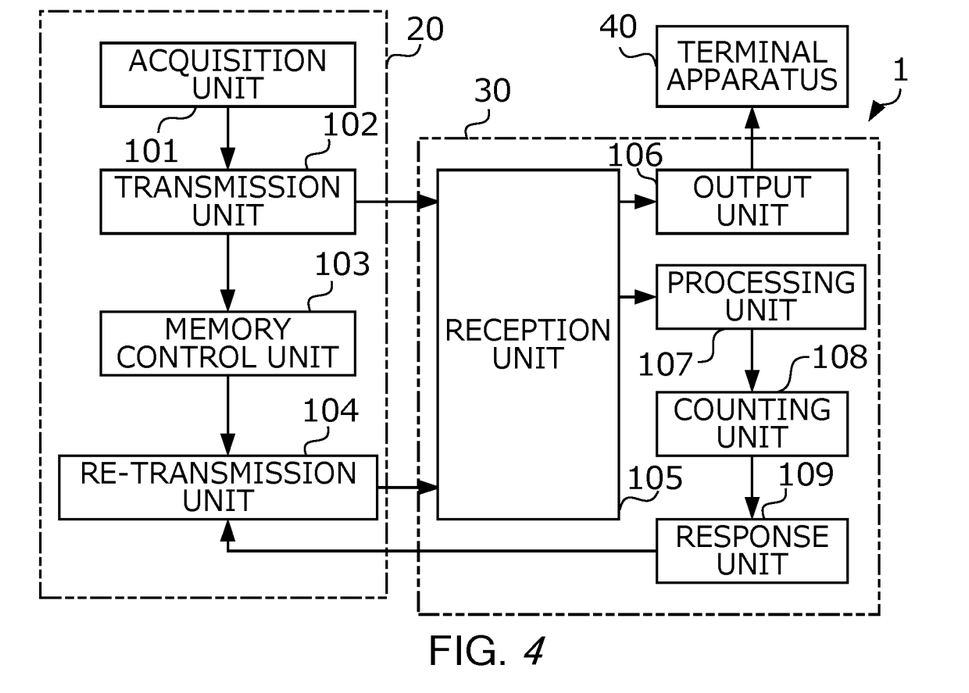
FIG. 4 is a diagram showing an example of a functional configuration of data collection system 1.

FIG. 4 is a diagram showing an example of a functional configuration of data collection system 1. Data collection system 1 functions as acquisition unit 101, transmission unit 102, memory control unit 103, re-transmission unit 104, reception unit 105, output unit 106, processing unit 107, counting unit 108, and response unit 109. In this example, acquisition unit 101, transmission unit 102, memory control unit 103, and re-transmission unit 104 are installed in client apparatus 20. Reception unit 105, output unit 106, processing unit 107, counting unit 108, and response unit 109 are installed in server apparatus 30.

Acquisition unit 101 is realized by processor 21 executing a client program stored in memory 22 and controlling communication interface 23. Acquisition unit 101 acquires multiple pieces of data indicating physical amounts detected by sensor 10.

Transmission unit 102 is realized by processor 21 executing a client program stored in memory 22 and controlling communication interface 23. Transmission unit 102 transmits, to server apparatus 30, a data set including a data string including at least a portion of the multiple pieces of data acquired by acquisition unit 101 and information indicating the number of pieces of data included in the data string. In the following description, this data set will be referred to as a "section". Also, a piece of data included in a section will be referred to as a "unit".

Figure 5:
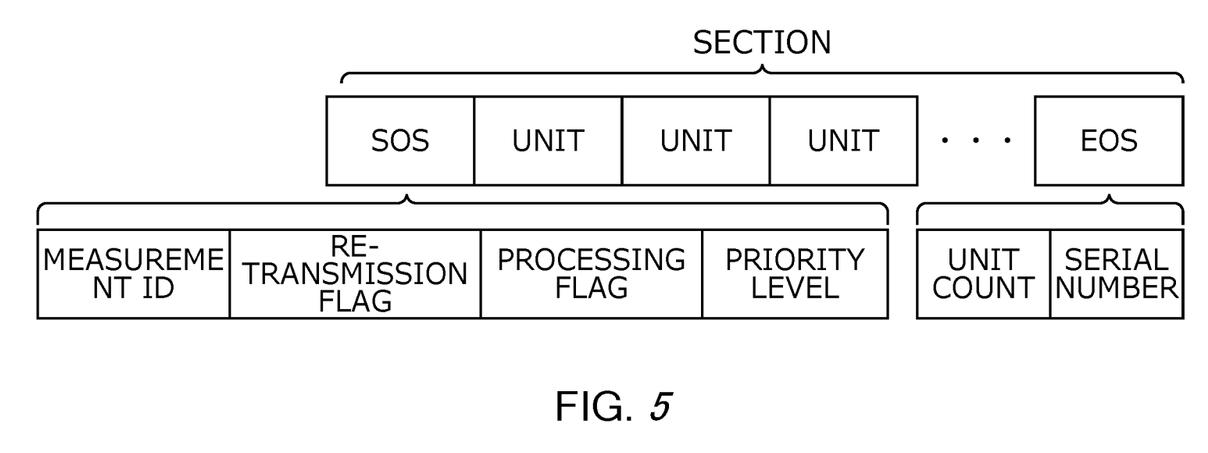
FIG. 5 is a diagram showing an example of a data format of a section.

FIG. 5 is a diagram showing an example of a data format of a section. A section includes an SOS (Start of Section), multiple units, and an EOS (End of Section). The SOS is information indicating the start of the section. The SOS is included at the front of the section. The multiple units are a series of data output chronologically from sensors 10, for example. The EOS is information indicating the end of the section. The EOS is included at the end of the section. The SOS and the EOS are used for data missingness management.

The SOS includes a measurement ID, a re-transmission flag, a processing flag, and a priority level. The measurement ID is information uniquely identifying each measurement unit. The measurement unit refers to a period from when generation of data is started to when generation of data is ended. For example, if the sensing target is a car, the period from when the engine of the car is started to when it is stopped is one measurement unit. The re-transmission flag is information indicating whether or not a section has been re-transmitted. For example, if the section has not been re-transmitted, that is, if it has been transmitted for the first time, the value of the re-transmission flag is 0. On the other hand, if the section has been re-transmitted, the value of the re-transmission flag is 1.

The processing flag is information indicating whether or not a section has been processed. For example, if a section has not been processed, the value of the processing flag is 0. On the other hand, if the section has been processed, the value of the processing flag is 1. The processing of the section is performed by deleting some or all units included in the section, or changing the value of a unit using an appropriate method, for example. Note that the appropriate method may be determined in advance.

The priority level is information indicating the priority level at the time of re-transmitting the section. The priority level is given to each section in advance in accordance with a predetermined condition such as the type or importance level of the data included in the section, for example. Here, the priority level is expressed as the numbers 1 to 3, priority level "1" being the highest, and priority level "3" being the lowest. However, the symbol indicating the priority level is not limited to this. For example, the priority level may also be indicated by a symbol other than a numerical value (e.g., character strings such as "High" and "Low"). Also, the priority levels may be divided into two levels or four or more levels. In other words, the priority level may be indicated using any kind of expression, as long as it is information indicating the priority level for when the section is re-transmitted.

The EOS includes a unit count and a serial number. The unit count is information indicating the number of units included in the section. The serial number is information uniquely identifying the section of the same measurement unit. The section is uniquely identified by the above-described measurement ID and serial number.

Returning to FIG. 4, reception unit 105 is realized by processor 31 executing a server program stored in memory 32 and controlling communication interface 33. Reception unit 105 receives a section from client apparatus 20.

Output unit 106 is realized by processor 31 executing a server program stored in memory 32 and controlling communication interface 33. If the SOS of the section received by reception unit 105 includes information indicating that the section has been transmitted for the first time, or for example, the re-transmission flag "0", output unit 106 sequentially outputs the unit to terminal apparatus 40 in response to the reception of the unit included in the section.

Processing unit 107 is realized by processor 31 executing a server program stored in memory 32. Processing unit 107 processes the section received by reception unit 105. In this processing, for example, the section is stored in a storage unit. For example, storage 34 is used as the storage unit. However, the storage unit is not limited to storage 34 and may also be a storage apparatus provided outside of server apparatus 30, for example.

Counting unit 108 is realized by processor 31 executing a server program stored in memory 32. Counting unit 108 counts the number of units included in the section received by reception unit 105.

Response unit 109 is realized by processor 31 executing a server program stored in memory 32 and controlling communication interface 33. Response unit 109 sends a response to client apparatus 20 if the number of units counted by counting unit 108 and the number of units indicated by the unit count included in the EOS match. For example, an ACK (ACKnowledgement) is used as the response.

Memory control unit 103 is realized by processor 21 executing a client program stored in memory 22. Memory control unit 103 stores the section transmitted by transmission unit 102 in memory 22, and if a response, that is, an ACK, is received from server apparatus 30, memory control unit 103 deletes the section stored in memory 22. For example, a memory region for re-transmission in memory 22 is used as the region for storing the section. The data is stored in a queue format, for example, in the memory region for re-transmission.

Re-transmission unit 104 is realized by processor 21 executing a client program stored in memory 22 and controlling communication interface 23. If a condition indicating that the number of units counted by counting unit 108 and the number of units indicated by the unit count included in the EOS are different is satisfied, re-transmission unit 104 re-transmits the section to server apparatus 30. The section is read out from the memory region for re-transmission in memory 22, for example, and is transmitted. The condition under which the section is re-transmitted is the condition that a predetermined amount of time elapses from transmission of the section without receipt of ACK, for example. However, the condition under which the section is re-transmitted is not limited thereto, and any kind of condition may be used, as long as it is indicated that the number of units counted by counting unit 108 and the number of units indicated by the unit count included in the EOS are different.

Operation

Figure 6:
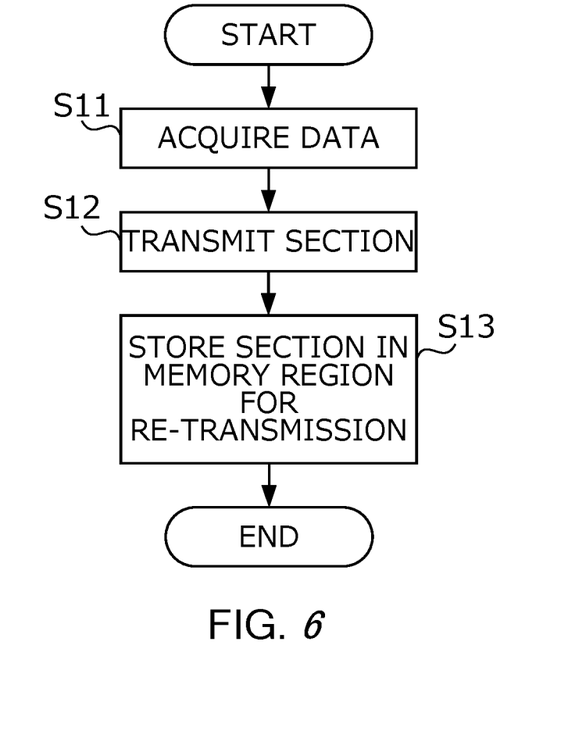
FIG. 6 is a flowchart showing an example of processing performed by client apparatus 20.
Figure 7:
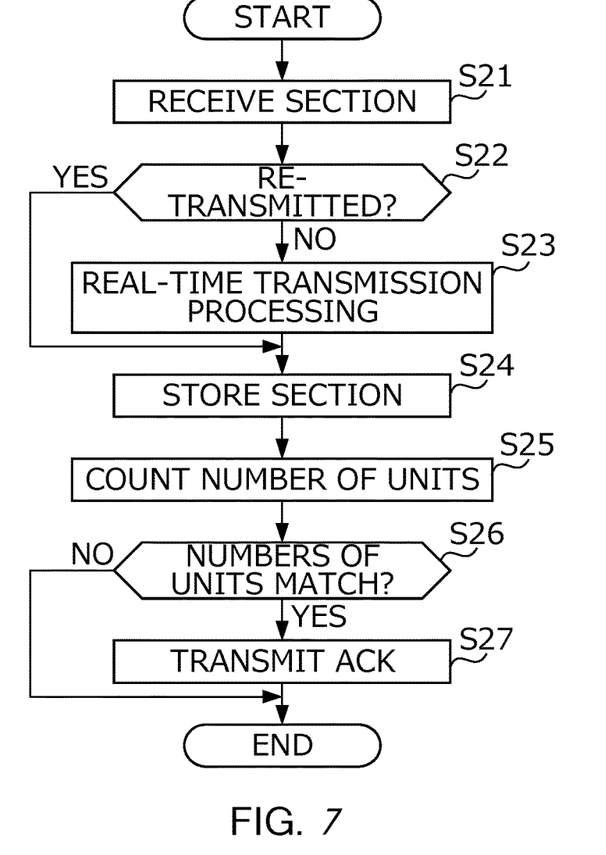
FIG. 7 is a flowchart showing an example of processing performed by server apparatus 30.
Figure 8:
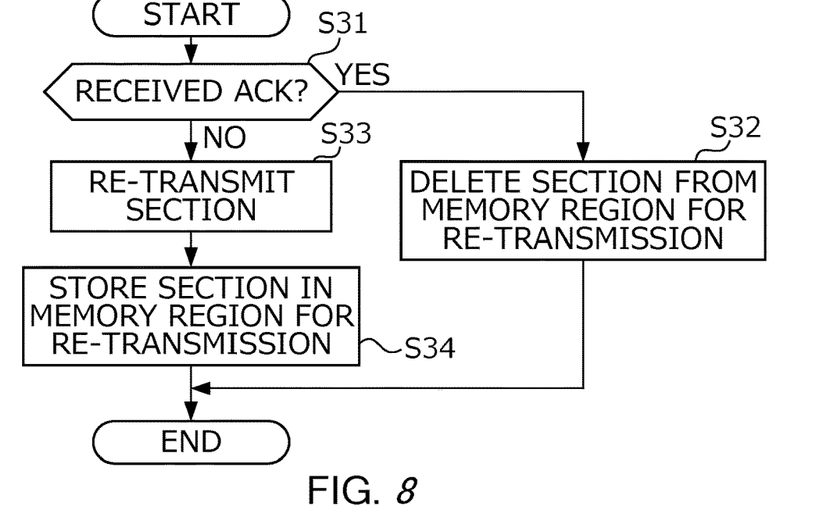
FIG. 8 is a flowchart showing an example of processing performed by client apparatus 20.

Next, operations performed by data collection system 1 will be described with reference to FIGS. 6 to 8. FIGS. 6 and 8 are flowcharts showing examples of processing performed by client apparatus 20. FIG. 7 is a flowchart showing an example of processing performed by server apparatus 30.

Sensors 10 detect physical amounts in predetermined sampling cycles, and sequentially output data indicating the detected physical amounts. The data is transmitted to client apparatus 20 via communication line 3. At this time, the data may also be transmitted according to the CAN protocol. The processing shown in FIG. 6 is started when the data is input to client apparatus 20.

In step S11, acquisition unit 101 sequentially acquires the input data. Accordingly, acquisition unit 101 acquires multiple pieces of data. Acquisition unit 101 adds a sensor ID and timestamp to each acquired piece of data. The sensor ID is information uniquely identifying sensor 10 that output the data. The time stamp is information indicating the amount of time that has elapsed until the date and time when the data is acquired, using the date and time when measurement is started as the origin.

In step S12, transmission unit 102 generates a section using the data acquired in step S11, and transmits the generated section to server apparatus 30. One section includes multiple pieces of data. For example, if the sampling frequency of sensors 10 is 1000 Hz and the section generation period is 50 Hz, one section includes 20 pieces of data output from sensors 10.

In this example, as shown in FIG. 5, a section includes an SOS, multiple units, and an EOS. The SOS includes the measurement ID "AAA", a re-transmission flag, a processing flag, and the priority level "2". Since the section is not re-transmitted, the value of the re-transmission flag is "0". Also, since the section has not been processed, the value of the processing flag is "0". Each unit includes data, a sensor ID, and a time stamp. The EOS includes the unit count "N" and the serial number "1". The unit count indicates that N units are included in the section.

Returning to FIG. 6, in step S13, memory control unit 103 stores the section transmitted in step S12 in the memory region for re-transmission in memory 22. At this time, the section is stored in the memory region for re-transmission in a queue format, for example.

When the section transmitted in step S12 reaches server apparatus 30, the processing shown in FIG. 7 is started.

In step S21, reception unit 105 receives a section from client apparatus 20. Here, depending on the state of communication line 2, data goes missing in some cases. For example, if a section including 20 units is transmitted from client apparatus 20, only 18 of the units are received in server apparatus 30 in some cases.

In step S22, output unit 106 determines whether or not the section received in step S21 is re-transmitted. In this example, since the value of the re-transmission flag included in the SOS of the section is 0, it is determined that the section is not re-transmitted (the determination in step S22 is NO). In this case, the flow advances to step S23.

In step S23, output unit 106 performs real-time transmission processing. The real-time transmission processing is started before the EOS of the section received in step S21 is received. In the real-time transmission processing, each unit included in the section is sequentially transmitted to terminal apparatus 40 in response to its reception.

In step S24, when the EOS of the section is received, processing unit 107 stores the section in storage 34.

In step S25, counting unit 108 counts the number of units included in the section received in step S21.

In step S26, response unit 109 determines whether or not the number of units counted in step S25 and the number of units indicated by the unit count included in the EOS of the section received in step S21 match. If the numbers of units match (the determination of step S26 is YES), it is indicated that the data of the section has not gone missing. In this case, the flow advances to step S27.

In step S27, reception unit 109 transmits an ACK to client apparatus 20. The ACK includes the SOS and EOS included in the section received in step S21. In this example, the SOS includes the measurement ID "AAA". Also, the EOS includes the serial number "1".

On the other hand, if it is determined in the above-described step S26 that the numbers of units do not match (the determination of step S26 is NO), this indicates that the data of the section is missing. In this case, the processing of above-described step S27 is not performed.

In client apparatus 20, after the section is transmitted to server apparatus 30 in above-described step S12, the processing shown in FIG. 8 is started.

In step S31, re-transmission unit 104 determines whether or not an ACK has been received from server apparatus 30. If an ACK has been received (the determination of step S31 is YES), this indicates that the data of the section transmitted in step S12 is not missing. In this case, the processing advances to step S32.

In step S32, memory control unit 103 deletes the section stored in above-described step S13 from the memory region for re-transmission in memory 22. In this example, the measurement ID "AAA" and the serial number "1" are included in the ACK received from server apparatus 30. In this case, the section including the same measurement ID "AAA" and serial number "1" is deleted from the memory region for re-transmission.

On the other hand, if a predetermined amount of time has elapsed without receiving the ACK in above-described step S31, that is, if a time-out has occurred (the determination in step S31 is NO), the flow advances to step S33.

In step S33, re-transmission unit 104 re-transmits the section stored in the memory region for re-transmission in memory 22 to server apparatus 30. Similarly to the section transmitted in above-described step S12, the SOS of the section includes the measurement ID "AAA", the re-transmission flag, the processing flag, and the priority level "2". However, since the section is to be re-transmitted, the value of the re-transmission flag is changed to "1". Also, if the segment has been processed, the value of the processing flag is changed to "1". Also, similarly to the section transmitted in above-described step S12, the EOS of the section includes the unit count "N" and the serial number "1".

Figure 9:
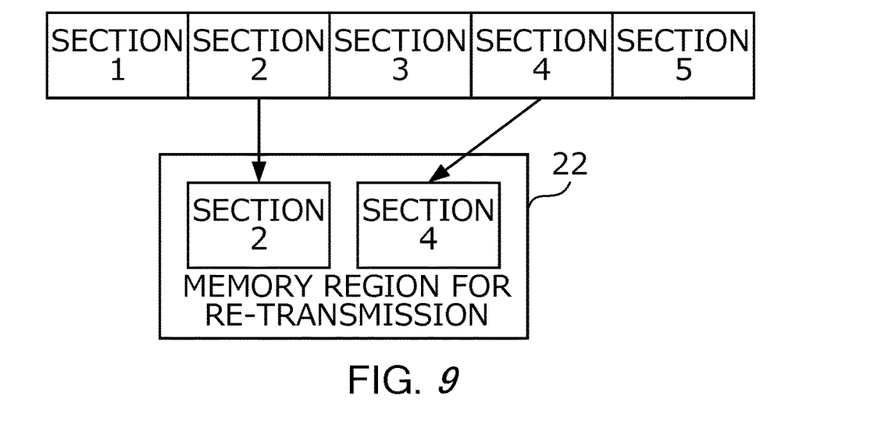
FIG. 9 is a diagram illustrating an example of a section re-transmission method.

FIG. 9 is a diagram illustrating an example of a section re-transmission method. In the following description, sections in which the serial numbers are "1" to "5" will be referred to as "section 1" to "section 5". Here, a case is envisioned in which sections 1 to 5 are transmitted from client apparatus 20 to server apparatus 30, and among these, sections 2 and 4 have data that has gone missing during transmission. In this case, in the memory region for re-transmission in memory 22, sections 2 and 4 are stored.

Sections 2 and 4 are re-transmitted at a predetermined timing, for example. The predetermined timing may be a time at which a predetermined amount of time elapses from when the determination of above-described step S31 becomes NO, for example. In another example, the predetermined timing may be a time at which the number of sections stored in the memory region for re-transmission reaches the predetermined number.

Also, the sequence in which sections 2 and 4 are re-transmitted may be the sequence in which they are stored in the memory region for re-transmission, that is, the following sequence: section 2, section 4. In another example, the sequence in which segments 2 and 4 are re-transmitted may be a sequence corresponding to the priority levels included in sections 2 and 4. For example, if the priority level included in section 2 is 2 and the priority level included in section 4 is 1, they may be re-transmitted in the following sequence: section 4, section 2.

Also, re-transmission unit 104 may subject a section to processing for deleting some or all of the units included in the section and re-transmit the processed section. For example, the units included in the section may be deleted at intervals of a predetermined number (e.g., every other unit may be deleted), or units that include a specific type of data and are included in the section may be deleted. This processing may be implemented on all sections stored in the memory region for re-transmission, or may be implemented on only the sections that satisfy a predetermined condition among the sections stored in the memory region for re-transmission. The predetermined condition may be the condition that the priority level is less than or equal to a threshold value, for example.

For example, if the priority level included in section 2 is 2, the priority level included in section 4 is 1, and the threshold value for the priority level is 2, the priority level of section 2 is less than or equal to the threshold value. In this case, only section 2 is processed. Thus, if section 2 is processed, the value of the processing flag included in section 2 is changed to 1.

Returning to FIG. 8, in step S34, memory control unit 103 stores the section re-transmitted in step S33 in the memory region for re-transmission in memory 22.

When the section re-transmitted in above-described step S33 reaches sever apparatus 30, the processing shown in FIG. 7 is started again.

In step S21, reception unit 105 receives the section from client apparatus 20.

In step S22, output unit 106 determines whether or not the section received in step S21 is re-transmitted. In this example, since the value of the re-transmission flag included in the SOS of the section is "1", it is determined that the section is re-transmitted (the determination in step S22 is YES). In this case, the flow advances to step S24, skipping over the processing of step S23.

In step S24, when the EOS of the section is received, processing unit 107 stores the section in storage 34. At this time, processing unit 107 selects the section including the same measurement ID and serial number as the new section received in step S21 from the sections stored in storage 34. Also, processing unit 107 stores the new section in storage 34 instead of the selected section.

Figure 10:
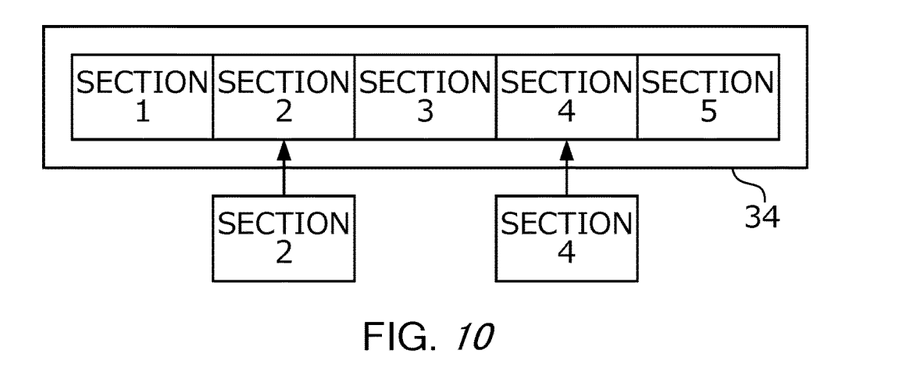
FIG. 10 is a diagram illustrating an example of a method for storing a re-transmitted section.

FIG. 10 is a diagram illustrating an example of a method for storing a re-transmitted section. Here, a case is envisioned in which sections 1 to 5 are transmitted from client apparatus 20 to server apparatus 30, and sections 1 to 5 are stored in storage 34. However, the data of sections 2 and 4 among sections 1 to 5 is missing. In this case, sections 2 and 4 are re-transmitted from client apparatus 20 to server apparatus 30.

When re-transmitted section 2 is received, existing section 2 stored in storage 34 is overwritten by section 2. Also, when re-transmitted section 4 is received, existing section 4 stored in storage 34 is overwritten by section 4. Accordingly, re-transmitted sections 2 and 4 are stored in place of sections 2 and 4 which have missing data.

Also, if a section received in step S21 has been subjected to processing for deleting a unit, processing unit 107 may generate data for supplementing the unit deleted through the processing, based on the unit included in the section. In the generation of the data, for example, the units before and after the deleted unit may be used, among the units included in the section, for example. However, the units to be used in generation of the data are not limited to the units before and after the deleted unit, and may be the unit at the location corresponding to the deleted unit, or all units included in the section, for example.

For example, if the value of the processing flag included in section 2 is "1", it is determined that section 2 has been processed. In this case, data for supplementing the deleted unit may be generated based on the units before and after the unit deleted through the processing among the units included in section 2. In this case, processing unit 107 may store section 2 in storage 34 after supplementing the unit deleted from section 2 using the generated data.

In this manner, after the re-transmitted section is stored, the processing of step S25 and onward is performed. The processing is similar to that performed when the section transmitted the first time is received.

According to the above-described embodiment, multiple pieces of data are consolidated into one section, and data missingness management is performed in units of sections, and therefore the amount of data needed for missingness management is less compared to the case of performing missingness management for each piece of data. Accordingly, the load of processing for ensuring the completeness of the data is reduced.

Also, in the above-described real-time transmission processing, transmission of data is started before the EOS is received, and the units are sequentially transmitted in response to reception of the units included in the section, and therefore the amount of time from when the data is output from sensors 10 to when the data is output to terminal apparatus 40 can be shortened.

MODIFIED EXAMPLES

The above-described embodiment is an example of the present invention. The embodiment may be modified as follows. Also, the following modified examples may be implemented in combination with each other.

Modified Example 1

In the above-described embodiment, re-transmission unit 104 may also perform re-transmission in a period during which the miss rate of data included in a segment received by reception unit 105 is less than or equal to threshold value H1. The miss rate of the data and the communication band are thought to be correlated. For example, the miss rate of the data and the communication band are in a relationship in which the miss rate of the data increases the narrower the communication band is. For example, the miss rate of data for which it is estimated that the communication band is sufficiently wide may be set to threshold value H1.

The miss rate of the data is the rate of the number of missing units with respect to the total number of units included in the section. Re-transmission unit 104 calculates the miss rate of the data as follows, for example. First, as described above, the ACK includes the unit count included in the EOS (hereinafter referred to as "first unit count"). Also, the unit count (hereinafter referred to as "second unit count") indicating the number of units counted by counting unit 108 is transmitted from server apparatus 30 to client apparatus 20. The second unit count may be included in the ACK and transmitted. In this case, the rate of the number of units indicated by the second unit count with respect to the number of units indicated by the first unit count is calculated as the data miss rate.

Figure 11:
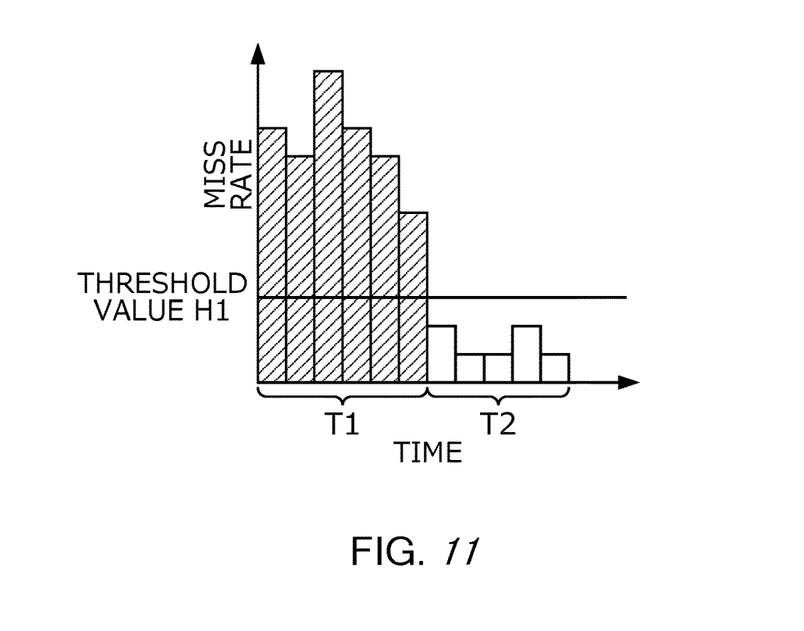
FIG. 11 is a diagram showing an example of a miss rate of data according to a modified example.

FIG. 11 is a diagram showing an example of a data miss rate. In this example, in period T1, the data miss rate is larger than threshold value H1. On the other hand, in period T2, the data miss rate is less than or equal to threshold value H1. In this case, re-transmission unit 104 may perform re-transmission of the section in period T2, without performing re-transmission of the section in period T1.

If the section is re-transmitted when the communication band is narrow, the communication band is taken up by the re-transmission of the section in some cases. At this time, for example, when real-time transmission processing of the section is performed in parallel, a delay occurs in the transmission of the data in the real-time transmission processing in some cases. According to this modified example, in a period during which it is estimated that the communication band is narrow, re-transmission of the section is not performed, and therefore the occurrence of this kind of delay is prevented.

Modified Example 2

In the above-described embodiment, re-transmission unit 104 may also re-transmit a section in a period during which the real-time transmission processing is not being performed. In this case, the real-time transmission processing is performed in response to a request from transmission apparatus 40, for example. Accordingly, if there is no request from terminal apparatus 40, the real-time transmission processing is not performed. In this case, information indicating that the real-time transmission processing has not been performed is transmitted from server apparatus 30 to client apparatus 20. Re-transmission unit 104 performs re-transmission of the section in response to having received this information.

According to this modified example, the re-transmission of the section and the real-time transmission processing of another section are not performed in parallel, and therefore the occurrence of a delay in the transmission of data in the real-time transmission processing is prevented.

Modified Example 3

In the above-described embodiment, re-transmission unit 104 may also generate multiple sections by dividing a section into multiple sections, and may re-transmit the generated multiple sections. The division of the section may also be performed when the data miss rate described in Modified Example 1 above is greater than threshold value H1, for example. In another example, the division of the section may also be performed according to the number of instances of re-transmission. Also, the number of divisions of the section may be increased the greater the number of instances of re-transmission is.

Modified Example 4

In the above-described embodiment, if it is estimated that the communication band is narrow, transmission unit 102 may also subject the section to processing for deleting some or all of the units included in the section and transmit the processed section. For example, the units included in the section may be deleted at intervals of a predetermined number (e.g., every other unit may be deleted), or units of a specific type that are included in the section may be deleted.

In this case, memory control unit 103 stores the section transmitted by transmission unit 102 in memory 22. For example, a memory region for transmission in memory 22 is used as the region for storing the section. Similarly to the above-described memory region for re-transmission, the data is stored in a queue format, for example, in this memory region for transmission.

Transmission unit 102 transmits the section stored in the memory region for transmission to server apparatus 30. Memory control unit 103 deletes the section transmitted by transmission unit 102 from the memory region for transmission.

Here, if the communication band is narrow, the new section is stored in the memory region for transmission with the transmission of the section stored in the memory region for transmission remaining incomplete, and therefore the number of sections stored in the memory region for transmission increases. If there are a large number of sections stored in the memory region for transmission, it is estimated that the communication band is narrow. In view of this, if the number of sections stored in the memory region for transmission is greater than or equal to a threshold value, transmission unit 102 may transmit the sections after performing processing. The number of sections in the memory region for transmission for which it is estimated that the communication band is narrow may be set as the threshold value, for example.

In this case, the value of the processing flag included in the processed section may be changed to 1. Also, similarly to the above-described embodiment, processing unit 107 may generate data for supplementing a unit deleted through the processing, based on the units included in the section.

In another example, if it is estimated that the communication band is narrow as described above, the section may be stored in the memory region for re-transmission without transmitting the section stored in the memory region for transmission. In this case, this section is transmitted to server apparatus 30 using a method similar to the above-described re-transmission of the section.

Modified Example 5

In the above-described embodiment, the method for determining whether or not the condition under which the section is re-transmitted has been satisfied is not limited to the method using an ACK sent as a response from server apparatus 30. For example, if the determination of step S26 shown in FIG. 7 is NO, a request for re-transmission may be performed from server apparatus 30 to client apparatus 20. In this case, when a request for re-transmission is received from server apparatus 30, it is determined that the condition under which the section is re-transmitted has been satisfied, and re-transmission of the section is performed.

In another example, if the determination of step S26 shown in FIG. 7 is NO, an error may be transmitted from server apparatus 30 to client apparatus 20. In this case, when the error is received from server apparatus 30, it is determined that the condition under which the section is re-transmitted has been satisfied, and re-transmission of the section is performed.

Modified Example 6

In the above-described embodiment, the output of a section is not limited to transmission from server apparatus 30 to terminal apparatus 40. For example, the data included in the section may also be displayed on a display provided in server apparatus 30. In another embodiment, the data included in a section may also be printed using a printer connected to server apparatus 30.

Modified Example 7

In the above-described embodiment, the data included in the section is not limited to the data output from a single sensor 10. For example, the section may also include data output from multiple sensors 10. In this case, for example, if the sampling frequency of one sensor 10 is 1000 Hz, the sampling frequency of another sensor 10 is 100 Hz, and the section generation frequency is 50 Hz, one section includes twenty pieces of data output from the one sensor 10 and two pieces of data output from the other sensor 10.

Also, when generating a section, only data output from one or more specific sensors 10 may be consolidated into the same section. This specific sensor 10 may output data of the same type or importance level, for example. This is because a priority level is given to each section, and therefore it is difficult to provide a priority level when one section includes data of different types or importance levels.

Also, the number of units included in one section may change for each section. For example, N units may be included in a certain section, and M (a number different from N) units may be included in the section to be transmitted next.

Modified Example 8

The step of processing performed by data collection system 1 is not limited to the example described in the embodiment above. The step of processing may also be replaced, as long as there is no discrepancy. The present invention may also be provided as a data collection method including a step of processing performed by data collection system 1.

Modified Example 9

The present invention may also be provided as a client program executed by client apparatus 20 or a server program executed by server apparatus 30. These programs may be downloaded via a communication line such as the Internet. Also, these programs may also be provided stored in a computer-readable storage medium, such as a magnetic storage medium (magnetic tape, magnetic disk, etc.), an optical storage medium (optical disk, etc.), a magneto-optical storage medium, or a semiconductor memory.

REFERENCE SIGNS LIST

1 Data collection system
10 Sensor
20 Client apparatus
30 Server apparatus
40 Terminal apparatus
101 Acquisition unit
102 Transmission unit
103 Memory control unit
104 Re-transmission unit
105 Reception unit
106 Output unit
107 Processing unit
108 Counting unit
109 Response unit

The invention claimed is:

1. A data collection system comprising:
an acquisition unit in a client apparatus, configured to acquire a plurality of pieces of data, each of the pieces of data indicating a physical amount detected by a sensor;
a transmission unit in the client apparatus, configured to transmit, to a server apparatus, a data set including a data string, the data string including at least a portion of the acquired plurality of pieces of data, and first information indicating a number of pieces of data included in the data string;
a reception unit in the server apparatus, configured to receive the data set from the client apparatus;
a processing unit in the server apparatus, configured to process the received data set; and
a re-transmission unit in the client apparatus, configured to re-transmit the data set to the server apparatus if a condition indicating that the number of the pieces of data included in the data set received by the server apparatus and the number of the pieces of data indicated by the first information are different is satisfied.

2. The data collection system according to claim 1, further comprising
a response unit in the server apparatus, configured to send a response to the client apparatus if the number of the pieces of data included in the received data set and the number of the pieces of data indicated by the first information match,
wherein the re-transmission unit re-transmits the data set to the server apparatus after a predetermined amount of time elapses from transmission of the data set without receipt of the response.

3. The data collection system according to claim 2, further comprising
a memory control unit in the client apparatus, configured to store the transmitted data set in a memory and, if the response is received, delete the data set stored in the memory,
wherein the re-transmission unit re-transmits the data set stored in the memory to the server apparatus.

4. The data collection system according to claim 1, wherein the data set includes identification information for identifying the data set, and the processing unit stores the received data set in a storage unit, and if a new data set including the same identification information as the data set is re-transmitted, the processing unit stores the received new data set in the storage unit instead of the data set stored in the storage unit, in response to the new data set being received by the reception unit.

5. The data collection system according to claim 1, wherein the transmitted data set includes, at its front, second information indicating that the data set has been transmitted for the first time, and the data collection system further comprises an output unit in the server apparatus, configured to, if the second information is included in the data set received from the client apparatus, sequentially output the data in response to reception of the data included in the data set.

6. The data collection system according to claim 5, wherein the data set includes, at its end, ending information indicating the end of the data set, and the output unit starts output of the data before the ending information included in the data set is received.

7. The data collection system according to claim 5, wherein the output unit performs output of the data in response to a request from a terminal apparatus, and the re-transmission unit re-transmits the data set during a period in which output of the data is not being performed by the output unit.

8. The data collection system according to claim 1, wherein the re-transmission unit re-transmits the data set during a period in which a miss rate of the data included in the data set received in the server apparatus is less than or equal to a first threshold value.

9. The data collection system according to claim 1, wherein the data set includes a priority level, and if a plurality of data sets are to be re-transmitted, the re-transmission unit re-transmits the plurality of data sets in accordance with a sequence corresponding to the priority level included in each of the plurality of data sets.

10. The data collection system according to claim 1, wherein the re-transmission unit subjects the data set to processing for deleting a portion or all of the data included in the data set, and re-transmits the processed data set.

11. The data collection system according to claim 10, wherein the processed data set includes third information indicating that the data set has been processed, and if the third information is included in the received data set, the processing unit generates data for supplementing the portion or all of the data deleted through the processing, based on the data included in the received data set.

12. The data collection system according to claim 1, wherein the re-transmission unit generates a plurality of data sets by dividing the data set into the plurality of data sets, and re-transmits the generated plurality of data sets.

13. The data collection system according to claim 1, further comprising a memory control unit in the client apparatus, configured to store the data set transmitted by the transmission unit in a memory, and when the data set is transmitted, delete the data set stored in the memory, wherein if the number of data sets stored in the memory is greater than or equal to a second threshold value, the transmission unit deletes a portion of the data included in the data set and transmits the resulting data set.

14. A data collection method comprising:

acquiring, by a client apparatus, a plurality of pieces of data, each of the pieces of data indicating a physical amount detected by a sensor;

transmitting, from the client apparatus to a server apparatus, a data set including a data string, the data string including at least a portion of the acquired plurality of pieces of data, and first information indicating a number of pieces of data included in the data string;

receiving, in the server apparatus, the data set from the client apparatus;

processing the received data set in the server apparatus; and re-transmitting, from the client apparatus, the data set to the server apparatus if a condition indicating that the number of the pieces of data included in the data set received by the server apparatus and the number of the pieces of data indicated by the first information are different is satisfied.

15. A client apparatus comprising:

an acquisition unit configured to acquire a plurality of pieces of data, each of the pieces of data indicating a physical amount detected by a sensor;

a transmission unit configured to transmit, to a server apparatus, a data set including a data string, the data string including at least a portion of the acquired plurality of pieces of data, and first information indicating a number of pieces of data included in the data string; and a re-transmission unit configured to re-transmit the data set to the server apparatus if a condition indicating that the number of the pieces of data included in the data set received by the server apparatus and the number of the pieces of data indicated by the first information are different is satisfied.

16. A server apparatus comprising:

a reception unit configured to receive a data set including a data string, the data string including at least a portion of a plurality of pieces of data, each of the pieces of data indicating a physical amount detected by a sensor, and first information indicating a number of pieces of data included in the data string, from a client apparatus including: an acquisition unit configured to acquire the plurality of pieces of data, a transmission unit configured to transmit the data set to a server apparatus, and a re-transmission unit configured to re-transmit the data set to the server apparatus after a predetermined amount of time elapses from transmission of the data set without receipt of a response;

a processing unit configured to process the received data set; and a response unit configured to send the response to the client apparatus if the number of the pieces of the data included in the received data set and the number of the pieces of data indicated by the first information match.

17. A non-transitory computer readable medium that stoics a program, the program when executed causing a computer to execute steps of:
  acquiring a plurality of pieces of data, each of the pieces of data indicating a physical amount detected by a sensor;
  transmitting, to a server apparatus, a data set including a data string, the data string including at least a portion of the acquired plurality of pieces of data, and first information indicating a number of pieces of data included in the data string; and
  re-transmitting the data set to the server apparatus if a condition indicating that the number of the pieces of data included in the data set received by the server apparatus and the number of the pieces of data indicated by the first information are different is satisfied.

18. A non-transitory computer readable medium that stores a program, the program when executed causing a computer to execute steps of:
  receiving a data set including a data string, the data string including at least a portion of a plurality of pieces of data, each of the pieces of data indicating a physical amount detected by a sensor, and first information indicating a number of pieces of data included in the data string, from a client apparatus including: a reception unit configured to receive the plurality of pieces of data, a transmission unit configured to transmit the data set to a server apparatus, and a re-transmission unit configured to re-transmit the data set to the server apparatus after a predetermined amount of time elapses from transmission of the data set without receipt of a response;
  processing the received data set; and
  sending the response to the client apparatus if the number of the pieces of data included in the received data set and the number of the pieces of data indicated by the first information match.

* * * * *